United States Patent [19]

Brummelhuis

[11] 4,082,221

[45] Apr. 4, 1978

[54] ROTATABLE ATOMIZER FOR SPRAYING A LIQUID

[75] Inventor: Johannes Arnold Julius Brummelhuis, Nieuwkoop, Netherlands

[73] Assignee: Stork Amsterdam B.V., Amstelveen, Netherlands

[21] Appl. No.: 738,960

[22] Filed: Nov. 4, 1976

Related U.S. Application Data

[63] Continuation of Ser. No. 607,820, Aug. 25, 1975, abandoned.

[30] Foreign Application Priority Data

Aug. 28, 1974 Netherlands .......................... 7411471

[51] Int. Cl.² ............................ B01D 1/16; B05B 3/10
[52] U.S. Cl. ................................ 239/214.25; 159/4 S; 233/1 A; 239/223; 277/53
[58] Field of Search ................... 239/214, 214.25, 223, 239/224; 159/4 S, 43 R, 43 A; 233/1 A, 1 E; 34/15, 58, 242; 277/53-57

[56] References Cited

U.S. PATENT DOCUMENTS

| 1,710,784 | 4/1929 | Nyrop | 239/224 |
| 1,853,682 | 4/1932 | Hechenbleikner | 159/4 S |
| 2,889,873 | 6/1959 | Sauter | 159/4 S |
| 2,917,241 | 12/1959 | Waldrum | 239/223 X |
| 3,112,239 | 11/1963 | Andermatt | 239/223 X |
| 3,251,601 | 5/1966 | Harvey | 277/53 |

FOREIGN PATENT DOCUMENTS 500,907  11/1954  Italy .................................. 239/214

Primary Examiner—Evon C. Blunk
Assistant Examiner—Andres Kashnikow
Attorney, Agent, or Firm—Haseltine, Lake & Waters

[57] ABSTRACT

A rotatable atomizer having a stationary supporting member and a rotatable disk with a shaft. The disk has an internal atomizing chamber with a plurality of substantially radially positioned discharge channels with a reduced cross-sectional outlet. Two labyrinth seals are provided between the supporting member and the disk as well as the shaft. Both seals have a steam supply.

1 Claim, 1 Drawing Figure

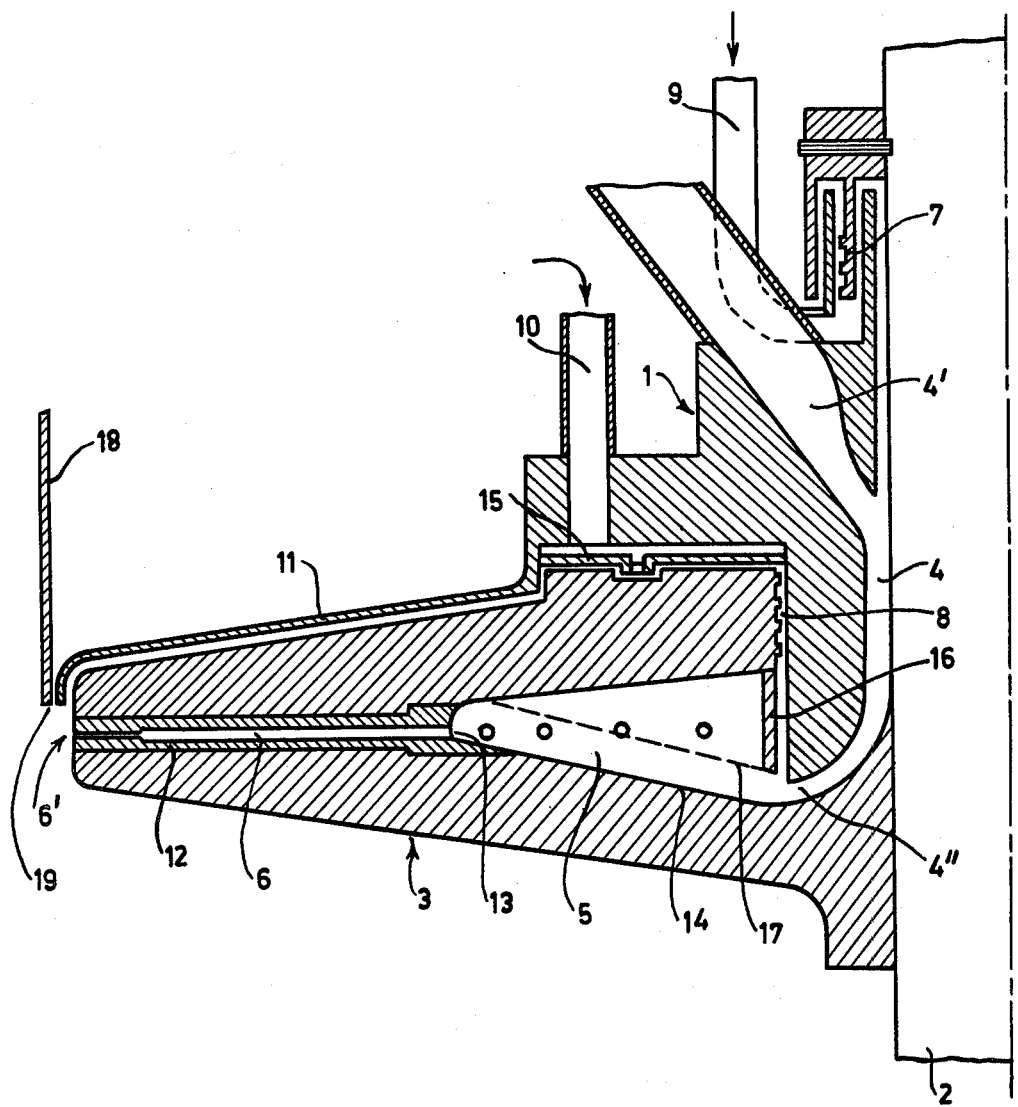

ROTATABLE ATOMIZER FOR SPRAYING A LIQUID

This is a continuation of application Ser. No. 607,820 filed Aug. 25, 1975 now abandoned

BACKGROUND OF THE INVENTION

My invention relates to a rotatable atomiser for spraying a liquid, comprising a stationary supporting member with a supply channel for liquid, and an atomiser disk having an inner atomising chamber and one or more discharge channels, the atomiser being secured to a preferably vertical rotatable shaft, a labyrinth seal being provided in combination with a fluid stream.

When such a fast rotating atomiser is utilised the phonomenon of air intrusion may occur notwithstanding the fluid stream. Air intrusion is due to the fact that the atomiser operates as a blower. According to this phenomenon air is sucked in along the shaft and is pumped via the atomiser disk, together with the liquid to be atomised, to a drying chamber. This air mixes with the liquid to be atomised and stimulates, after atomisation, the formation of a voluminous powder with a low dumping weight. The disadvantages of a low dumping weight are:

the required additional packing material, transport material, storage space etc.;

foam formation on dissolving the product;

a lower resistance to harmful ambient influences, such as oxidation, owing to a greater boundary surface between the dry substance and the air.

Various sealing means have been tried in order to limit this air intrusion, but at high rotational speeds the suction of the air is so strong that the conventional sealing means applied so far do not operate satisfactorily. Besides, it is difficult to seal the atomiser disk mechanically against suction of air from the drying space.

SUMMARY OF THE INVENTION

My invention aims seeks to solve the problem of air intrusion effectively, which is achieved by incorporating two labyrinth sealing members, one between the supporting piece and the shaft and the second between said piece and the atomiser disk the supporting piece being provided with steam supply channels opening into both labyrinths, the discharge channels of the atomiser disk having an outlet with a reduced cross-section. Due to these features any suction of air through the space between the supporting piece and shaft or the supporting piece and the atomising disk is almost excluded, as in the first instance steam will be sucked in. The volume flow of the sucked steam is limited due to the high flow resistance of the labyrinth sealing members. The limited quantity of sucked in steam condenses in the atomiser and mixes with the liquid to be atomised.

It is indeed known per se to use steam when spray drying a liquid by means of a rotatable atomiser, in order to obtain a high dumping weight. According to this known method, the liquid is heated by means of steam before atomisation is effected. In this known method the steam serves to heat the liquid, contrary to the invention in which the steam has a sealing function.

SURVEY OF THE DRAWINGS

The sole FIGURE of the drawing is an axial section through one half of an atomiser according to the invention.

DESCRIPTION OF A PREFERRED EMBODIMENT

The atomiser represented in the drawing is substantially constructed of a stationary arranged supporting piece 1 with an atomiser disk 3 secured to a rotatable vertical shaft 2. The supporting piece 1 has a liquid supplying channel 4 via which the liquid to be evaporated can be transmitted to an atomising chamber 5 within the atomiser disk 3. The atomiser disk 3 can be rotated by means of the shaft 2, and it has narrow discharge channels 6 which extend in a horizontal plane in a radial and/or partially transverse direction from atomising chamber 5 as far as the outer circumference of atomiser disk 3.

During the spray drying process, the liquid to be evaporated flows through supply channel 4 into atomising chamber 5 and leaves this chamber, accelerated by centrifugal force, via the discharge channels 6 as a finely distributed cloud.

Any suction of air due to pumping of the atomiser is prevented by labyrinth sealings 7, 8 between supporting piece 1 and shaft 2 as well as between supporting piece 1 and disk 3. Supporting piece 1 is provided with two steam delivery channels 9, 10 opening into the labyrinths of labyrinth sealings 7, 8 respectively. Thus the two labyrinths can be furnished with steam so that instead of air, steam is sucked during the spray drying process. This steam condenses during this process and mixes with the liquid.

Supporting piece 1 further has a cover plate 11, entirely covering the upper side of atomiser disk 3 and extending as far as the vicinity of the ends of the discharge channels. Cover plate 11 causes an increase of flow resistance of labyrinth sealing 8, thus improving the sealing effect of the latter. Since outflow of steam takes place in the vicinity of the liquid discharge openings, the outflowing liquid can less easily absorb air, which will benefit the process.

The discharge channels 6 consist of stepped bores in detachable inset tubes 12. The diameter of the bore at the end of each discharge channel 6 is smaller than that of the remaining portion of the said channel 6. Hence the ends of each discharge channel 6 will be entirely filled with liquid during the process. In other words they will not have a liquid level, so that no air can be absorbed. Moreover acceleration of the liquid speed together with the very high velocity in the discharge channels 6 has a homogenizing effect on the liquid to be evaporated.

The inwardly directed end faces 13 of the inset tubes adjoin the circumferential face of the atomising chamber 5. Thus, the circumferential face has no projections which can influence the flow pattern in the atomising chamber 5 such that the liquid would absorb more air.

The end 4' of supply channel 4 is tangentially directed relative to shaft 2. As a consequence one may adjust the liquid speed to the circumferential velocity of the shaft 2, so that an advantageous flow is produced which absorbs little air.

The liquid supply channel 4 opens into the atomising chamber 5 at the level of the lower surface 14 of this chamber 5, in a direction perpendicular to the center line of the atomiser disk 3, so that the liquid to be evaporated is urged to flow onto the horizontal surface of the bottom of the atomising chamber.

Bottom 14 of the atomising chamber has a slightly conical concave construction and constitutes a saucer, the top of this conical surface being downwardly directed. The flow is thus pressed against the inclined surface 14 whereby any splashing of the liquid and foam formation is counteracted.

The atomiser disk 3 is further provided with a ring 16 which is coaxially situated around shaft 2 and delimits the atomising chamber 5 in an inward direction. Ring 16 extends in a downward direction as far as the upper side of end 4" of the supply channel 4 opening into atomising chamber 5. This ring 16 prevents the liquid in chamber 5 from splashing back against the outer wall of supporting piece 1 and acts as a check on contamination of this wall. The same result can be obtained if the upper wall of atomising chamber 5 is constructed according to the dotted line denoted by 17.

Furthermore, a jacket 18 encloses the atomiser and extends in a downward direction to the vicinity of the circumferential edge 19 of cover plate 11. An annular slit 19 will now appear between the lower edge of this jacket 18 and the circumferential edge of cover plate 11. Via this slit 19 air for cooling the bearings (not shown) of the shaft 2 can be added to the atomised liquid, which air improves the drying process of the atomised liquid.

What is claimed is:

1. A rotatable atomizer for spray drying a liquid comprising a stationary supporting member, a supply channel for liquid, and an atomizer disk having an inner atomizing chamber and at least one discharge channel, the atomizer being secured to a vertical rotatable shaft, two labyrinth sealing members, one of said sealing members being placed between the supporting member and the shaft and the second of said sealing members being placed between said supporting member and the atomizer disk, said supporting member having steam supply channels opening into both labyrinths, the discharge channels of the atomizer disk having an outlet with a reduced cross section, each discharge channel comprising a stepped bore having a diameter smaller than that of the other part of the discharge channel, said discharge channels comprising inset tubes with an inwardly directed end face of each inset tube lying flush with the inner wall of the atomizing chamber, the inlet end of the liquid supplying channel being tangentially directed with respect to the shaft, the liquid supplying channel opening into the atomizing chamber at the level of the lower surface of said chamber in a direction perpendicular to the axis of rotation of the atomizer disk, the bottom of the atomizer chamber being substantially conical, the apex of the conical surface being downwardly directed, the conical bottom extending smoothly and concavely from its periphery toward the end of the supply channel, the edge of the upper surface of the atomizing chamber adjacent to the supporting member being situated at almost the same level as the upper side of the end of the supply channel, the atomizer disk having a ring coaxially around the shaft and limiting the atomizing chamber in an inward direction, said ring extending in a downward direction as far as the upper side of the end of the supply channel, and a jacket enclosing the atomizer and extending in a downward direction to the vicinity of the circumferential edge of a cover plate.

* * * * *